(12) United States Patent
Johnson

(10) Patent No.: US 7,114,062 B2
(45) Date of Patent: Sep. 26, 2006

(54) PROCESSOR WHICH ACCELERATES EXECUTION OF BINARY PROGRAMS INTENDED FOR EXECUTION ON A CONVENTIONAL PROCESSOR CORE, USING A RECONFIGURABLE COMBINATIONAL LOGIC ARRAY, A FUNCTION LOOKUP UNIT, AND A COMPATIBLE CONVENTIONAL PROCESSOR CORE, WITHOUT REQUIRING RECOMPILATION

(76) Inventor: Luther A. Johnson, 208 Third St., Cambridge, MA (US) 02141

( * ) Notice: Subject to any disclaimer, the term of this patent is extended or adjusted under 35 U.S.C. 154(b) by 463 days.

(21) Appl. No.: 10/681,404

(22) Filed: Oct. 8, 2003

(65) Prior Publication Data

US 2005/0149704 A1 Jul. 7, 2005

Related U.S. Application Data

(63) Continuation-in-part of application No. 09/477,047, filed on Dec. 31, 1999, now abandoned.

(51) Int. Cl.
*G06F 15/16* (2006.01)
(52) U.S. Cl. .................. 712/226; 712/34
(58) Field of Classification Search ............ 712/226, 712/34
See application file for complete search history.

(56) References Cited

U.S. PATENT DOCUMENTS

| 5,361,373 A | * | 11/1994 | Gilson ..................... 712/1 |
| 5,892,934 A | * | 4/1999 | Yard ...................... 712/203 |
| 5,933,642 A | * | 8/1999 | Greenbaum et al. ...... 717/140 |
| 6,446,163 B1 | * | 9/2002 | Hazelzet et al. ........ 711/115 |

* cited by examiner

*Primary Examiner*—Eric Coleman
(74) *Attorney, Agent, or Firm*—David G. Rasmussen

(57) ABSTRACT

The invention uses a standard processor to execute an application program. As the instructions of the application program are executed in sequence, a program counter is incremented to contain an address indicator of the next instruction to be executed. The address indicator from the program counter is also fed to a function lookup unit where it is matched to the contents of a tag field. If there is no match, control returns to the processor which continues its normal sequence of operations and performs the function. If there is a match, function indicator identifiers from the function lookup table are fed to a reconfigurable combinational array which has logic functions. The function indicator identifiers select the logic function to be performed. The result of the performed function including the new program counter is then fed back to the processor. The processor then continues its normal operations.

9 Claims, 9 Drawing Sheets

DETAIL OF FLU

CACHE ENTRY LINE DETAIL

<u>CCC FLOW</u>

FIG.5 FLU FLOW DIAGRAM

COMPILING BY EXHAUSTIVE ENUMERATION

COMPILING BY CONDITIONAL EXPRESSION EXPANSION

EXCEPTION ROUTINE FLOW

FIG. 10

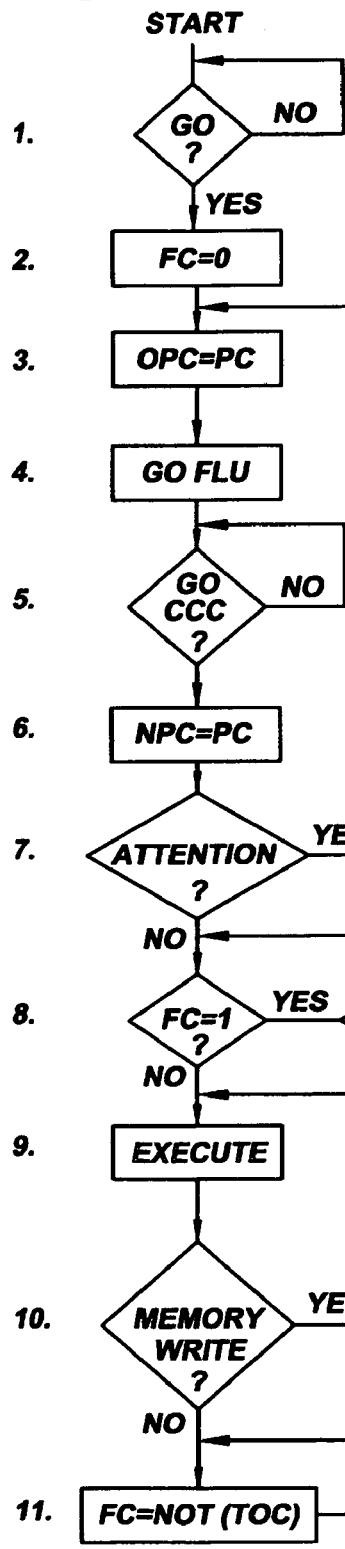

1. REMAIN IDLE UNTIL GIVEN FIRST GO (RESET) SIGNAL.

2. INITIALIZE FLU "FREEZE CACHE" STATE TO "NOT FROZEN".

3. SAVE CURRENT PC IN OPC.

4. IDLE CCC AND SEND GO SIGNAL TO FLU.

5. WAIT FOR "GO CCC" FROM IDLE FLU.

6. GET NEW VALUE OF PC IN NPC.

7. IF FLU HAS SIGNALLED ATTENTION, PROCESS EXCEPTION.

8. IF THE FLU CACHE IS FROZEN, BUT NPC ≠ OPC, INDICATING THAT A LOGICAL FUNCTION WAS EXECUTED, UN-FREEZE THE CACHE AND GO TO 3.

9. EXECUTE THE INSTRUCTION AT PC IN THE CONVENTIONAL WAY.

10. IF THE INSTRUCTION WROTE MEMORY, SEND AN OVERWRITE MESSAGE TO THE FLU. PROCEED TO 11.

11. FREEZE THE FLU CACHE IF THE LAST INSTRUCTION IS NOT A TRANSFER OF CONTROL, OTHERWISE, UN-FREEZE IT. GO TO 3.

PROCESSOR WHICH ACCELERATES EXECUTION OF BINARY PROGRAMS INTENDED FOR EXECUTION ON A CONVENTIONAL PROCESSOR CORE, USING A RECONFIGURABLE COMBINATIONAL LOGIC ARRAY, A FUNCTION LOOKUP UNIT, AND A COMPATIBLE CONVENTIONAL PROCESSOR CORE, WITHOUT REQUIRING RECOMPILATION

This is a continuation-in-part of U.S. Request for Continued Examination application Ser. No. 09/477,047 filed Mar. 25, 2003, inventor Luther A. Johnson which claims priority from patent application Ser. No. 09/477,047, filed Dec. 31, 1999, inventor Luther A. Johnson, both which are hereby incorporated by reference

BACKGROUND OF THE INVENTION

1. Field of the Invention

The present invention relates to a central processor capable of accelerating program execution. More specifically, the invention relates to an architecture and scheme for interconnecting an otherwise conventional CPU core with a functional unit containing a lookup table and a reconfigurable combinational logic array in order to speed up the execution of general purpose, ordinary integer type operations.

2. Description of the Related Art

The Central Processing Unit (CPU) of a computer is responsible for executing programs, which are comprised of sequences of basic operations called instructions. The instructions need not be executed one at a time, or in the same order as specified by the program, as long as the actual sequence performed yields the same state changes (registers, memory, I/O) at any point in the program where this state can be observed. Most modern CPUs employ a number of techniques which allow the instruction execution mechanism to perform certain operations out-of-order, in parallel, in overlapping stages, speculatively, or not at all. Often the design of the instruction set is intimately intertwined with the execution model chosen, and places complex requirements on the programmer or programming language compiler for both correct program operation and optimal performance. This invention describes an alternative arrangement of a CPU core and a functional unit which provides a new strategy for program acceleration which succeeds in many instances where the current practice fails. It neither requires nor precludes the use of current state of the art techniques in the CPU core, and can be regarded as a complementary resource for enhancing processor performance.

SUMMARY OF THE INVENTION

CPUs often use internal or external functional units or co-processors to aid or perform computation of a particular nature. Examples are floating point coprocessors, functional units for memory management, and dedicated or reconfigurable logic and processors for special purpose computations, such as digital signal processing. This invention provides an architecture and scheme for interconnecting an otherwise conventional CPU core with a functional unit containing a lookup table and a reconfigurable combinational logic array with a program counter and registers shared by both units in order to speed up the execution of general purpose, ordinary integer type operations comprising the bulk of the CPU's instruction workload. This scheme allows the reconfigurable combinational logic array to be reconfigured dynamically, in response to real-time program behavior, as well as statically beforehand, for "hand-tuned" programs where particular portions of the program are known to be critical to create logic functions that run in place of critical blocks of instruction code. This maximizes the performance level.

In more detail the invention is a central processing unit having a first processor for executing program instructions and addressing memory. A function lookup unit shares a program counter and registers with the first processor. The program counter contains the address of the next instruction to be performed. The function lookup unit has a lookup cache with a tag field, and a function indicator field. The lookup cache communicates with the program counter to determine the presence of a match between the contents of the tag field and the program counter. Upon finding a match between the tag field and the program counter indicator, the function lookup unit assumes control of execution of the instruction indicated by the program counter. Upon finding no match the first processor assumes control of execution of the instruction indicated by the program counter. The function lookup unit further has a reconfigurable combinational array having logic functions available which provide a mapping from a beginning state on entry to a block of code to an ending state on exit from the block of code. The functions have identifiers in the function indicator field. The reconfigurable combinational array receives the function indicator identifiers from the lookup cache upon finding a match between the tag field and the program counter indicator. The functional indicator identifiers cause the function to be executed in place of a block of instructions starting at the program counter instruction location.

The central processing unit may also include an exception routine that provides logic synthesis for a block of instructions identified by the program counter indicator. This is done in response to an attention signal from the FLU. The exception routine provides a synthesized function to the reconfigurable combinational array and a corresponding function indicator in the function indicator field.

DESCRIPTION OF THE DRAWINGS

FIG. 10 shows a second alternative embodiment of CCC 12.

DETAILED DESCRIPTION OF THE INVENTION

Figure 1:
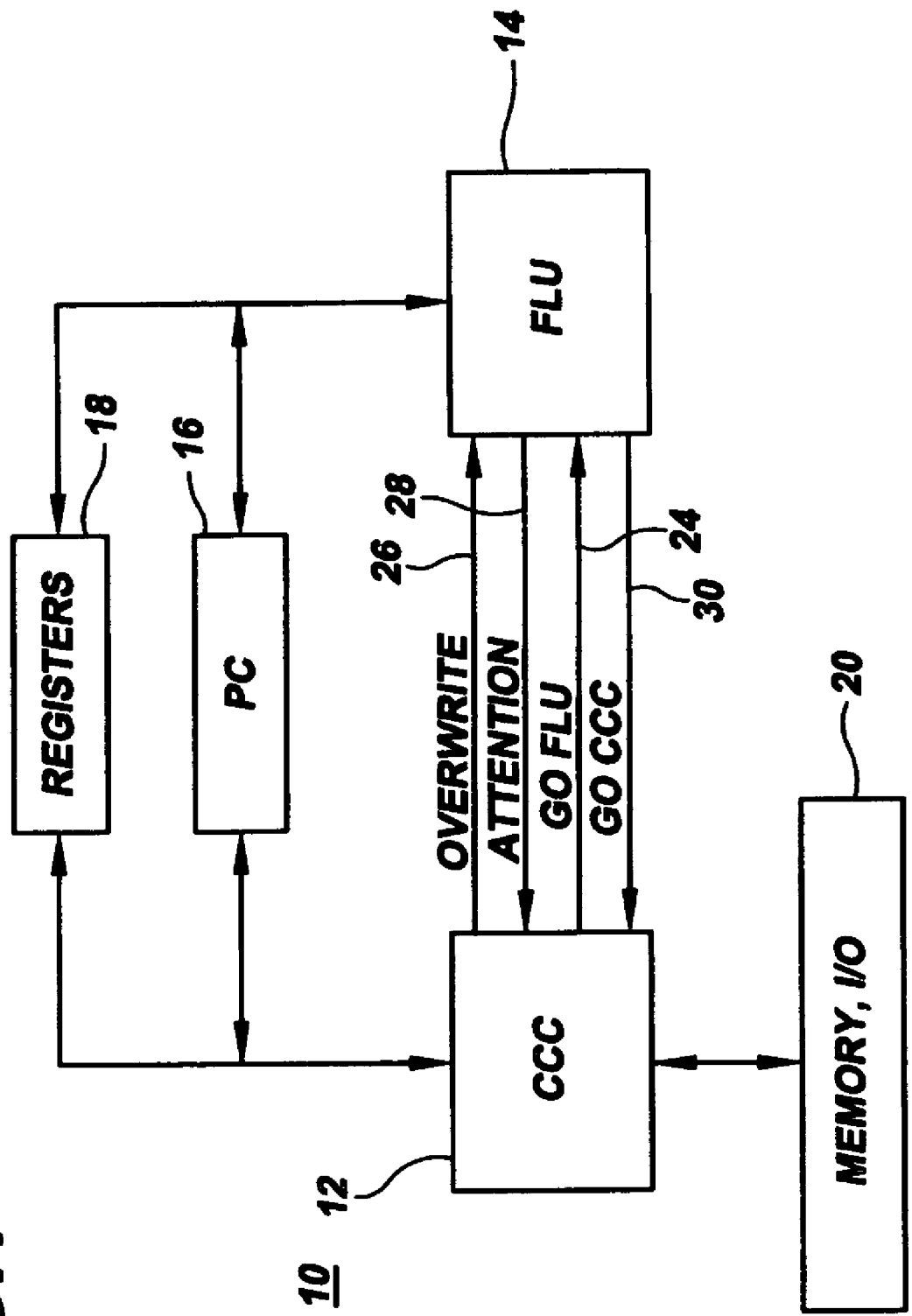
FIG. 1 is a block diagram showing the operational relationship of CCC 12 and FLU 14.
Figure 8:
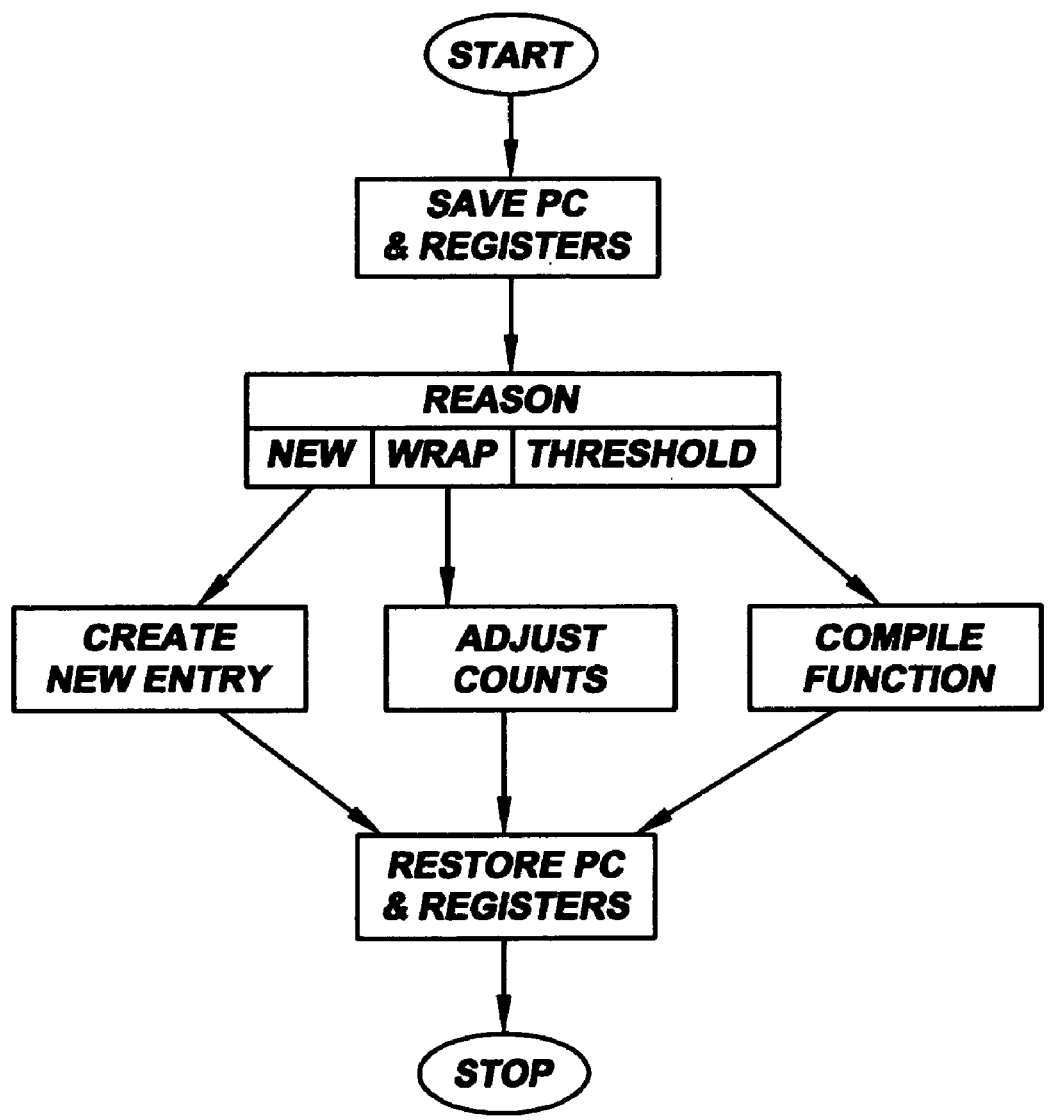
FIG. 8 is a flow diagram for the exception routine.

FIG. 1, shows a CPU or processor system 10 which contains a conventional CPU core (CCC) 12 where "conventional" means that it has the capability to execute instructions by itself without any additional functional units, according to one of the many existing schemes. The processor system 10 also has a Function Lookup Unit (FLU) 14 which shares access to CCC 12 volatile (non-memory) state, which for the most part is the program counter 16 and various other registers 18. Conventional CPU Core (CCC 12) and Function Lookup Unit (FLU 14) take turns advancing the volatile state of the CPU which they share. Memory and I/O 20 communicate to processor system 10 through CCC 12. In general, CCC 12 operates as a normal processor and executes sequential program instructions whose addresses are contained in the program counter. The purpose of FLU 14 is to store logic functions that execute blocks of program instructions. In other words the output of the logic function is identical to the output of the execution of the block of program instructions. A program may contain many blocks of instructions that are repeated. FLU 14 will store logic functions for many of these blocks of instructions. FLU 14 will execute the logic function in place of the block of instructions each time the block comes up in the program. The logic function can usually function in several clock cycles whereas the block of instructions may take many clock cycles to perform. Furthermore, FLU 14 recognizes when a block of instructions occurs a threshold number of times and should be synthesized into a logic function which is stored in FLU 14. The logic functions in FLU 14 may be either preloaded before the program is executed or synthesized on the fly as the program is running by an exception routine which may be a part of CCC 12. The flow diagram for the exception routine is shown in FIG. 8. Communications between CCC 12 and FLU 14 are done via communication lines 24–30. Communication line 24 is a "GO FLU" command line where CCC 12 passes instruction execution control to FLU 14. Overwrite line 26 is used by CCC 12 to inform FLU 14 of memory writes. Attention line 28 is a control line from FLU 14 to request assistance from CCC 12. One of these requests is to activate the exception routine and compile a function for a block of instructions. Communication line 30 is a "Go CCC" command line where FLU 14 passes instruction execution control to CCC 12. The two "GO" signals indicate that the sending unit has become idle and the receiving unit should begin running.

Figure 2:
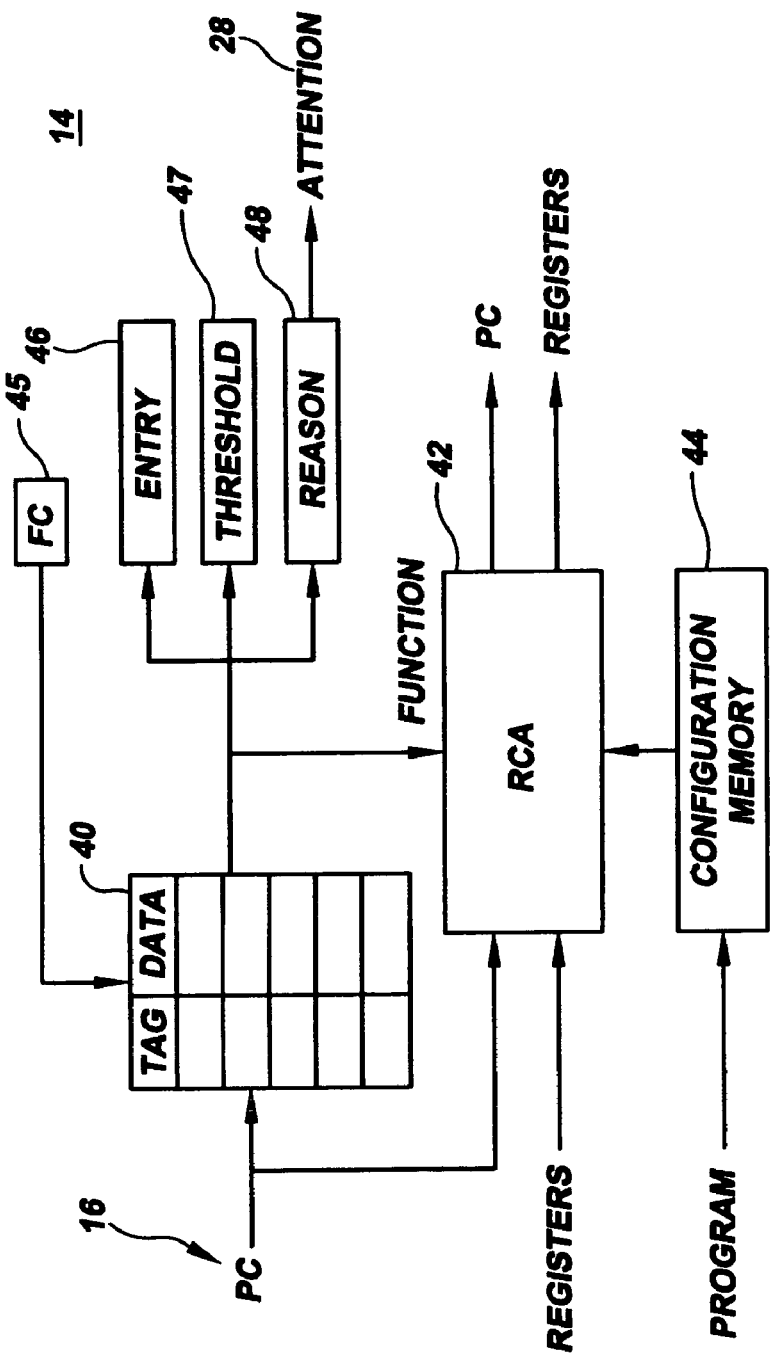
FIG. 2 is a detailed block diagram of the components of FLU 14.

FIG. 2 is a detailed block diagram of the components of FLU 14. It contains a lookup table (cache) 40, a reconfigurable combinational logic array (RCA) 42, configuration memory 44 for array 42, FC (Freeze Cache) control bit 45, ENTRY register 46, THRESHOLD register 47, and REASON register 48. The details of the FLU are as follows. After being presented with a PC (16) marking the entrance to a block, the FLU 14 either executes the block via the RCA (42)(i.e. function hit), notes the entrance in the cache (i.e. entrance hit), or requests attention from the CCC (12). Program counter 16 communicates with both the reconfigurable combinational logic array 42 and lookup table 40.

Figure 3:
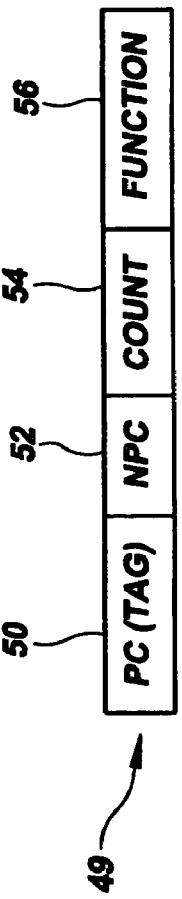
FIG. 3 shows the detail for an entry or line in the cache in FLU 14.

FIG. 3 shows the detail for an entry or line 49 in cache 40. TAG 50 contains the program counter (PC) instruction location for the beginning of a block of code. NPC 52 is the next PC instruction address after the end of the code block. Count 54 is the count of times this address has been presented to FLU 14 by CCC 12 after the cache entry for the block of instructions was created. Function 56 is the index of the function to present to the function selector of the reconfigurable combinational logic array RCA 42 in order to execute this block (i.e. function 56 identifies the function to be selected for execution). Certain values in function 56 will indicate no function is present in reconfigurable combinational logic array 42 for the selected entry in cache 40. There may be additional information recorded in this entry to aid in compilation.

In more detail, cache 40 may be organized as a fully or partly associative table. If partly associative, it is indexed by some subset of bits of PC 16. PC 50 field, or tag of any entry must equal the presented PC exactly in order to be considered a match, or "hit". The COUNT field contains the counter which is updated by FLU 14 on each time it is presented with PC 16 value contained in this entry. When a line must be targeted for removal, the COUNT field can be used by the CCC exception routine to identify the least used entry. NPC indicates the "next" PC or address which is one byte beyond the last byte of program code spanned by this block. This is used by FLU 14 to determine code overwrites. Any cache entries which cover blocks of overlapping memory writes reported to FLU 14 via OVERWRITE messages will be removed by FLU 14 (made un- matchable or function-less).

Looking more closely at FIG. 1 FLU 14 and CCC 12 take turns executing portions of the program as it proceeds. Never are both units active at the same time, therefore there are no collisions nor contentions with respect to the shared state. CCC 12 executes instructions, one at a time or according to any sort of semantically equivalent execution model, until a transfer of control (non-sequential next PC) instruction is executed (branch, conditional branch, subroutine call, software interrupt or trap, subroutine or interrupt return, etc.). At this point it idles so that FLU 14 may determine if there is a function for this block outstanding. If no function is found control returns to CCC 12. If a function is found, the FLU 14 takes over (when it finds it contains a function which can) and performs the effects of an entire block of register accessing instructions at once. It does this by presenting all of the registers 18 and PC 16 to a very wide combinational logic array, and selecting the function specific to this block of code which computes all of the resulting registers and new PC. The updated registers and PC are written back, and the block of code has been executed. If the next block of code can be executed in this manner, the process is repeated. Execution proceeds, a block at a time, until FLU 14 has no function corresponding to the code to be processed. At this point, FLU 14 idles and CCC 12 resumes. FLU 14 at this point may also signal ATTENTION to request some action on the part of CCC 12.

FLU 14 finds functions for blocks of code by presenting the current PC 16 to its cache 40 (FIG. 2). If PC 16 matches the TAG 50 of some entry (FIG. 3), and the rest of the data in the entry indicates that a function exists for this block, the appropriate function number 56 (FIG. 3) is applied to the function selector of the reconfigurable combinational array RCA 42. This array is loaded with programming information that configures it much like a giant ALU, with many functions available, all of which provide mapping from a beginning state, on entry to a block of code, to an ending state, on exit from the block. Blocks are defined to be a contiguous sequence of instructions having one entrance at the starting address and at least one exit. They can comprise an entire program or any subset thereof.

The functions available in RCA 42 (and having function indicators in function field 56 in cache line 49) may be generated in two ways. The functions may be generated ahead of time and preloaded into RCA 42 prior to executing a program or they can be generated on the fly by an exception routine as the program operates. Other ways to enter the functions are also considered within the scope of the invention.

The RCA 42 can be loaded, and the logic functions therein implemented can be computed in either software or hardware. The methods described here will hereafter assume that these tasks are done in software, with the understanding that anything that can be specified algorithmically and implemented in software can be replaced with microcode or hardware logic in an alternative implementation.

The software that configures FLU 14 and compiles the logic that is loaded into RCA 42 runs on CCC 12, and is invoked by an exception or interrupt triggered by the "Attention" signal 28 (FIG. 1). The lookup cache 40, RCA 42, and all other parts of FLU 14 are resident in an I/O or memory space of CCC 12, in order that they may be read and written by CCC 12 software.

Two status registers in FLU 14 are used to inform CCC 12 of the nature of FLU's ATTENTION request. REASON register 48 contains an integer value indicating the reason for the exception, and ENTRY register 46 contains an integer indicating the index of the entry in the cache involved in the outstanding request. CCC 12 also communicates with FLU 14 as an I/O device while it is otherwise idle, via the OVERWRITE message. If any writes to memory occur during the execution of code by CCC 12, it sends the address of the memory location and the length in bytes of the write to FLU 14, which it will then use to "remove" any outstanding cache entries for blocks overlapping the range of memory about to be written. It "removes" these entries by making them un-matchable to any PC, or by setting the function index in the cache entry to some illegal value. The idea here is to prevent FLU 14 from executing a function corresponding to old code once the code has changed or has been overwritten.

Two control registers in FLU 14 control its on-the-fly behavior (as opposed to its configuration by CCC 12, when it is essentially a slave peripheral device). These are the "Freeze Cache" (FC) 45 bit and the THRESHOLD register 47. During normal operation, if a PC is presented to FLU 14 for which there is no match, FLU 14 will signal ATTENTION 28 with a reason of "new entry", and idle itself. CCC 12, in its exception routine, will choose an unused cache entry or some other entry to load with the new PC. It will zero a count 54 in the entry and return. If a PC is presented to FLU 14 for which there is a match, whether there is a function compiled or not, the count (which represents the number of visits to this address) will be incremented. If this value exceeds the capacity of the count field 54 in the cache line, FLU 14 will signal ATTENTION with a reason of "count wrap" and idle. CCC 12 exception 22 may choose to ignore this, or it may normalize the count 54 in all entries so that a rank of most used to least used is preserved while reducing the count values of all entries. If no function exists for this block, count 54 is then compared to THRESHOLD 47. If the threshold value contained in this register has been reached, FLU 14 will then know that this entry has been identified by FLU 14 as a candidate for a compiled function. The exception routine will compile a function if it chooses, update the cache 40 and reconfigurable array RCA 42, and return. FLU 14 never creates entries in cache 40 or loads RCA 42 itself. It merely informs CCC 12 of important milestones so that the exception routine may manage the cache 40 and RCA 42. If the FC bit 45 is set, none of these attention signals are raised, and FLU 14 will not update count 54 in cache 40 entries. FC bit 45 might be turned on by the compile exception code, so that it can complete a compile without that code itself triggering a compile exception, if the supported level of exception nesting has been exceeded, or it might be turned on after a certain "optimal" set had been loaded, so that certain portions of a program would consistently run at high speed. Freezing the cache 40 obtains a static configuration of cache 40 and RCA array 42, which will not be affected by any program behavior or interactions between CCC 12 and FLU 14, except for OVERWRITE messages, which are always honored by FLU 14, regardless of the FC bit 45.

Figure 4:
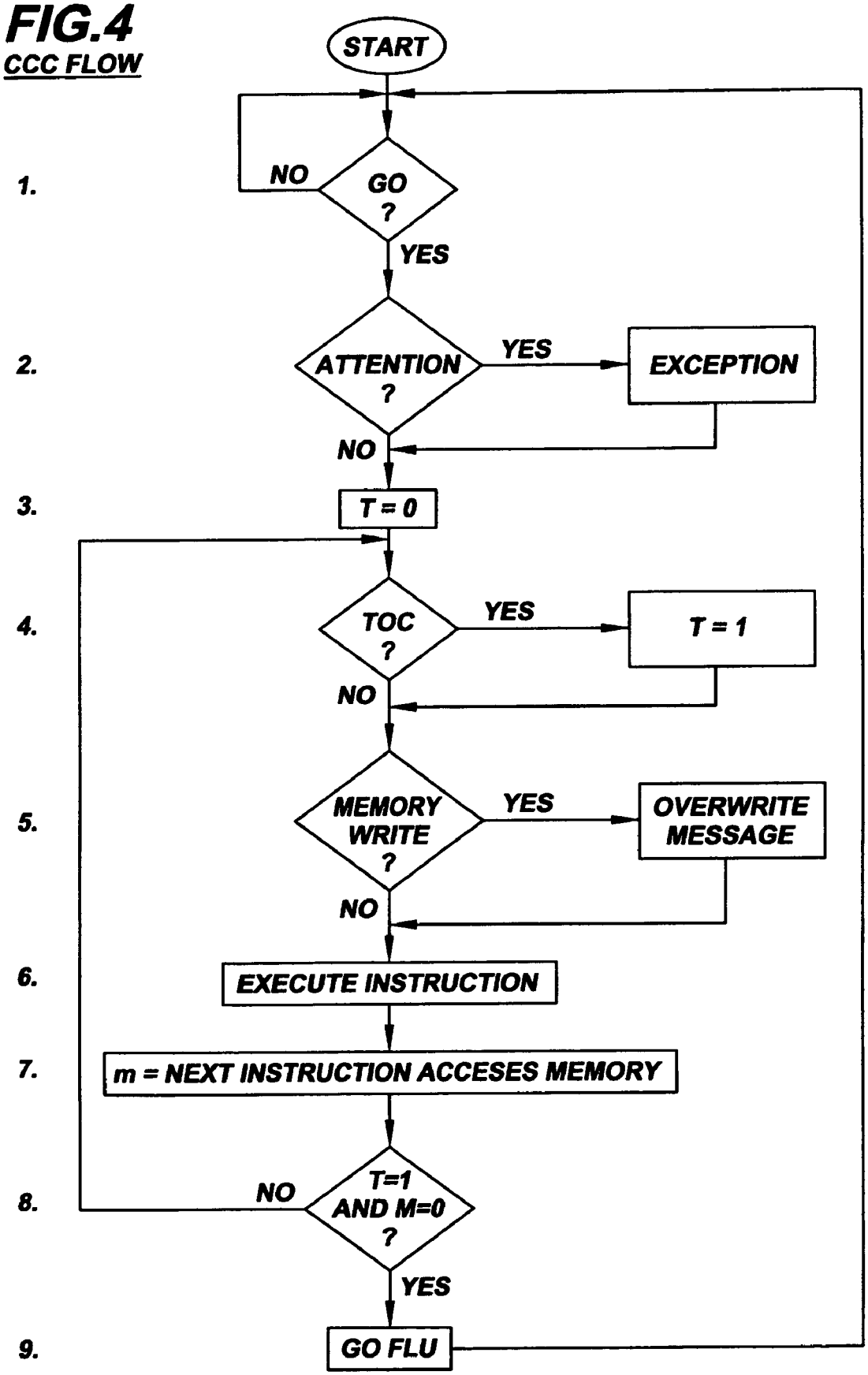
FIG. 4 is a flow diagram depicting CCC operation and interaction with FLU 14.

FIG. 4 is a flow diagram depicting CCC 12 operation and interaction with FLU 14. The following is a legend with a numbered line by line description of FIG. 4. The numbered lines of FIG. 4 correspond to the numbered lines of the legend.

CCC FLOW LEGEND

1. Wait to go.
2. If attention signal asserted, take exception and deassert attention signal.
3. Set T to 0
4. If current instruction is transfer of control, T=1.
5. If current instruction writes to memory, send address and length to FLU (overwrite message).
6. Execute instruction and update state (registers, PC).
7. If next instruction accesses memory then M=1. If not M=0.
8. If not (T=1 and M0), go to 4
9. Send GO signal to FLU and idle. Go to 1

In FIG. 4 the CCC is idle until given a GO signal (either from the FLU or as a function of reset). If the ATTENTION signal is raised, an exception is taken (the PC is saved somewhere and then set to the address of the exception routine). Execution continues on the CCC until the first instruction that does not access memory is reached after a transfer of control instruction is executed. This marks the entrance of a block of instructions that might be executed by the FLU, and so the CCC idles and signals the FLU to start. While executing instructions, the CCC keeps the FLU informed of all writes to memory via the OVERWRITE message.

Figure 5:
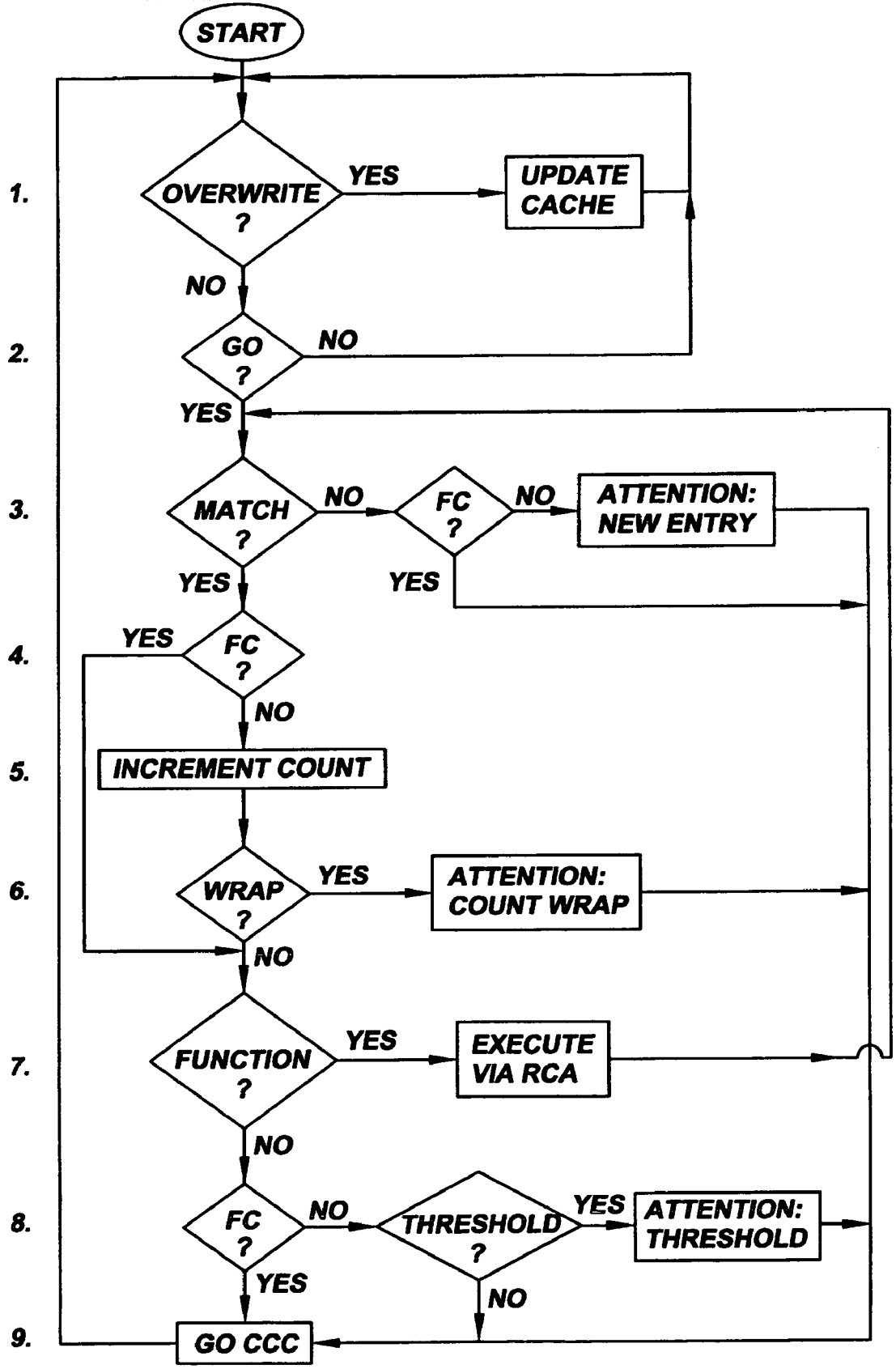
FIG. 5 is a flow diagram depicting FLU operation and interaction with CCC 12.

FIG. 5 is a flow diagram depicting FLU 14 operation and interaction with CCC 12. The following is a legend with a numbered line by line description of this FIG. 5. The numbered lines of FIG. 5 correspond to the numbered lines of the legend.

FLU FLOW

1. While idle, check for overwrite messages. If writes overlap any cache entries, delete these entries (make them unmatchable).
2. If still idle, go to 1.
3. Look for matching PC in cache. If match, go to 4, Otherwise, if cache not frozen (FC), signal attention with reason of "new entry". Go to 9
4. If cache frozen, go to 7.
5. Increment counter in cache entry.
6. If counter wraps, signal attention with reason of "count wrap". Go to 9.
7. If a function is compiled for this block, execute via the reconfigurable combinational array RCA and return to the output of go ? (2). If function output is no go to 9.

8. If the cache is not frozen and if the threshold for compilation has been reached, signal attention with reason of "threshold".

Send GO signal to CCC, and idle. Go to 1.

In FIG. 5 the FLU is idle until given a GO signal (either from the CCC or as a function of reset). While otherwise idle (not actively attempting to execute the program), the FLU responds to OVERWRITE messages and removes cache entries that correspond to areas of memory that are being overwritten. Once the FLU has received the GO signal, it attempts to find a cache entry with a compiled function corresponding to the current PC, and either executes the block of code at the current address, or returns control to the CCC. If it has executed a block of code, it will attempt to find another match and only returns control to the CCC when it finds no match. While it is inspecting the cache, it may update the COUNT field of cache entries or request ATTENTION from the CCC if the cache is not frozen.

Figure 6:
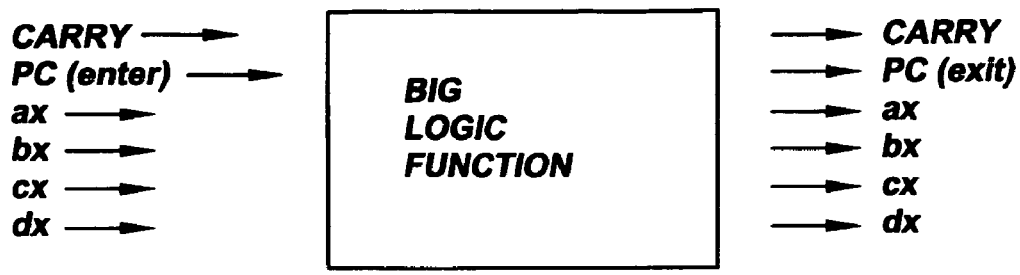
FIG. 6 is an overall representation of the logic functions that would be compiled in the reconfigurable array to execute this block.

An example block of code is shown below and an overall representation is shown in FIG. 6. A representation of the logic functions in C language that would be compiled in the reconfigurable array to execute this block is shown in APPENDIX 1.

EXAMPLE CODE BLOCK

This code example is written in the machine language of the Intel 8086. For the purposes of this discussion, it has inputs ax, bx, cx, dx, cf, and pc and outputs ax, bx, cx, dx, cf, and pc. ax, bx, cx, and dx are 16 bit registers, and cf is a one bit "carry" flag. The ostensible purpose of this code is to add the contents of ax, (a two's complement signed 16 bit integer) to an unsigned 32 bit sum held in dx (most significant) and bx (least significant) if and only if ax is positive. After adding ax, if the high order register (dx) of the sum overflows, then the sum is divided by two, rounded up, and a scale count is incremented (register cx). The code begins at "enter" and in all cases of this example ends at "exit".

```
enter:  cmp    ax, 0
        jle    exit
        add    bx, ax
        adc    dx, 0
        jnc    exit
        shr    dx, 1
        rcr    bx, 1
        adc    bx, 0
        adc    dx, 0
        inc    cx
exit:
```

This block of code can take 2, 5, or 10 instructions to traverse. But it can be done in one step by expressing ax, bx, cx, dx, and the program counter and carry as a combinational logic function of the initial values of these registers.

Figure 7A:
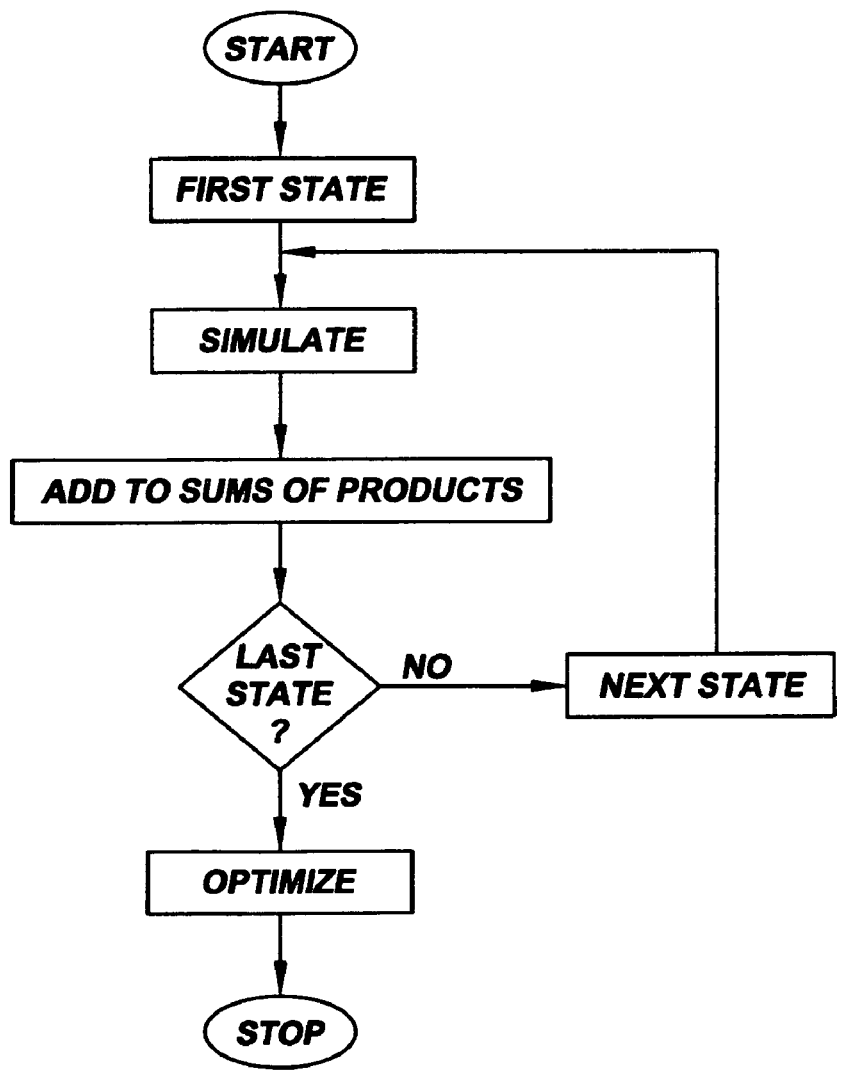
FIG. 7a shows one method of function compilation.
Figure 7B:
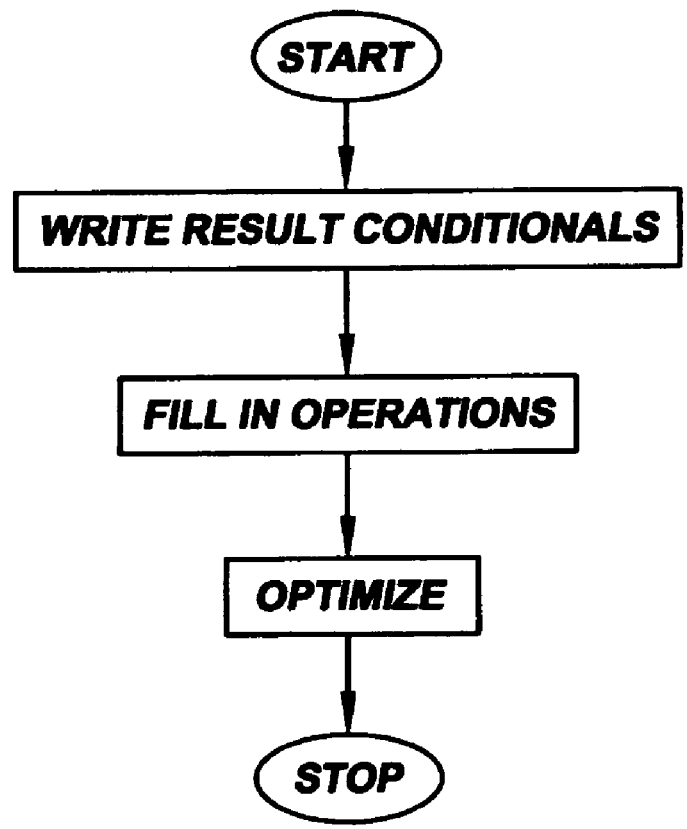
FIG. 7b shows an alternative method of function compilation.

FIGS. 7a and 7b show the function compilation process. This is the detail of what happens inside the box labeled "COMPILE FUNCTION" in FIG. 8 when the reason is "threshold". Two possible methods of logic synthesis are described, but other approaches, or hybrids of these two approaches are possible as well. The fact that compilation can be done in software leaves this area open to various implementations.

In FIG. 7a the first method of function compilation, called here "Exhaustive Enumeration", works by setting the registers that are accessed by the block of code examined to every combination of every possible value, simulating the execution of the block of instructions to obtain the resulting values of all the registers for each of these cases, and adding the results to truth tables, maintained in sum-of-products form. These sum-of-products logic equations (one for each bit of result) can then be optimized according to standard boolean logic optimization techniques.

In FIG. 7b the second method of function compilation, called here "Expression Expansion", synthesizes logic functions from descriptions of the semantics of the individual instructions, which are then used to create conditional expressions similar to those in FIG. 6. These expressions are then expanded so that complex operations like "+" can be replaced with boolean logic equivalents, and separated into expressions for each bit of result. Finally, as in the previously described method, these boolean logic equations are optimized.

FIG. 8 shows the basic operation of the exception routine. In FIG. 8 the exception routine saves the old PC (return address) and the registers to some area of memory, according to the definition of exceptions in the CCC. It then inspects the REASON for this exception, and either 1) creates a new cache entry, possibly overwriting an old, less used entry, or 2) adjusts the counts in one or more cache entries in response to an overflow of the COUNT field in one entry, or 3) compiles a function to execute the block of code starting at the return address (PC before exception was taken). The exception routine restores the registers and the PC, returning to the point at which the exception was taken.

Figure 9:
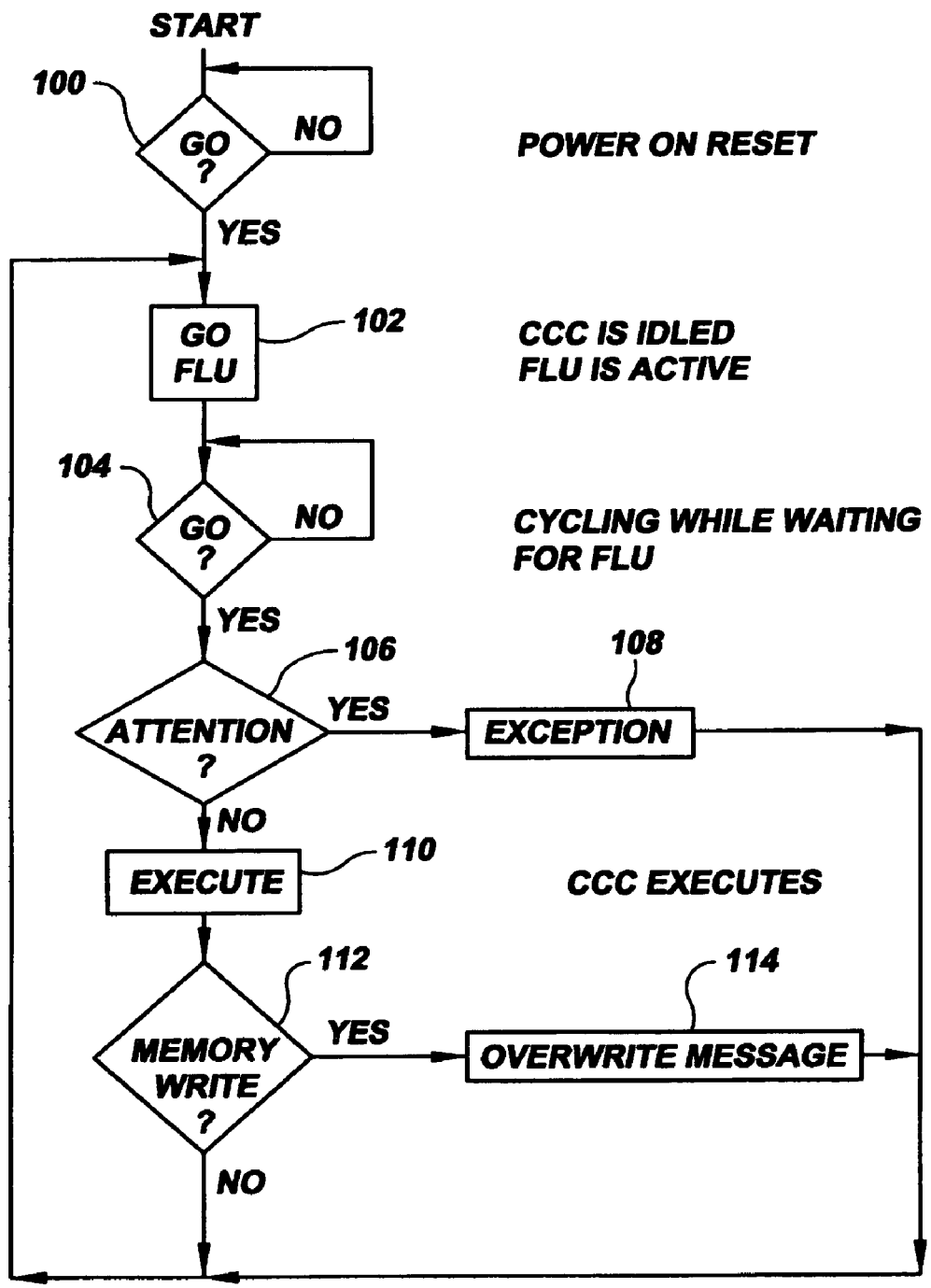
FIG. 9 shows an alternative embodiment of CCC 12.

FIG. 9 shows an alternative embodiment of CCC 12. The first decision diamond GO 100 is simply for initialization and power on reset. If GO 100 is yes, the next block is the GO FLU 102 block. This means that the CCC has transferred control, the FLU which is active. The CCC is idled. The next decision diamond is GO 104 which idles while waiting for the FLU to transfer control back to the CCC. A yes output from decision diamond GO 104 indicates that control has returned to the CCC 12 and attention diamond 106 decides whether an exception 108 is to be executed. If attention diamond 106 has a no output then CCC executes an instruction in execution block 110. After the execution of the instruction the CCC makes a memory write decision in memory write diamond 112. If the output is yes, an overwrite message 114 is generated. If the output is no then CCC 12 returns back to the yes output of the Go 100 decision diamond. If an exception 108 is executed or an overwrite message is written a return is made to the input of GO FLU 102.

FIGS. 4, 9, and 10 are alternative schemes for CCC flow. In each of these schemes, the CCC breaks from ordinary program execution at key points in order to advise the FLU of candidate code for replacement by logical functions, and to allow the FLU to execute logical functions it may already have in place of code immediately at hand. Each of these schemes has its advantages and disadvantages.

FLU functions are limited in this invention to expressions or blocks of code involving registers only. Therefore, blocks of code to be replaced may not contain memory references. FIG. 4 chooses to advise/consult the FLU after every transfer of control instruction, if and only if the next instruction to be executed is not a memory-referencing instruction. This is simple and efficient, as it guarantees a sequential block of 1 or more instructions eligible for replacement by a logical function every time the CCC yields control to the FLU, and control is yielded to the FLU only at the start of a candidate (or replaced) block. There are two disadvantages to this scheme, however: 1) Basic blocks which contain replaceable (register-only) code, but which start with a memory referencing instruction, will not be accelerated, and 2) It is necessary to read the first instruction of the next block in order to determine if it accesses memory.

FIG. 9 addresses both of these issues by consulting the FLU prior to every instruction. This allows functional replacements to be associated with any program counter address. The process which creates these functions replacements is then responsible to replace the appropriate register-only code, and to place the appropriate entry points in the FLU cache. This is an extremely simple solution. A disadvantage of this approach is that the FLU is consulted on every instruction, and depending on the processor implementation, this may be inefficient. Another issue is that multiple candidates for functional replacement are created for each basic block of code, which may overburden the cache and the function compilation process.

In FIG. 10, the freeze-cache feature of the FLU is used by the CCC operational flow in order to separate the two functions of advice (notifying the FLU of a candidate for functional replacement) and consent (allowing the FLU to execute a replacement function, skipping over the instructions immediately at hand). In this scheme, the CCC yields to FLU with the lookup cache un-frozen on every transfer of control, and after every successful replacement function execution. This allows all basic blocks that are not yet replaced to be considered as candidates, and just once, on entry to the block. After that, the FLU is consulted on successive instructions with the lookup cache frozen, so that any pre-existing functions will be found, but no new candidates will be created. In this way, the FLU is consulted for a replacement on every instruction, but the function compilation process is just notified once per candidate basic block. This process is responsible to create functions for register-only code and attach them to the proper entry addresses, as before. This scheme still has the disadvantage that the FLU is consulted for a replacement function on every instruction execution. It is also more complex than those in FIGS. 4 and 9.

The CCC/FLU interaction schemes of FIGS. 4, 9, and 10, as well as many others, can all be implemented with the same elements, structures, and signals of the proposed invention.

Unique features of this invention are:

1) Other schemes for accelerating the execution of instructions (pipelining, superscalar techniques, speculative or out-of-order execution) on general purpose processors are intimately involved with both the instruction set architecture and micro-architecture of the instruction execution engine on the processor. Except for the prescribed protocol and conventions covering the interactions between the processor and logic array, and the requirements for shared access to certain processor state, this design makes no demands on the architecture of the conventional processor, and is independent of any instruction set. It transparently accelerates the execution of programs, and user-level programs (as opposed to operating systems, compilers, linkers, run-time libraries, etc.) need not be aware of its existence. In addition, the conventional processor core may use any or none of the existing techniques for accelerating instruction execution, so long as it meets the requirements specified by the invention.

2) This mechanism works on integer code, which comprises the bulk of operation of most any computer. Other functional units or coprocessors are geared toward special purpose code and data.

3) Other architectural speed-up techniques work best on code that contains many instructions that may be done in parallel, or in any order, but do poorly on code that has already been aggressively optimized, in which a minimum length code path has been found and each operation is strictly dependent on the results of the previous one. This mechanism accelerates this code as well, and in fact rewards is traditional manual and automatic code optimization strategies.

4) Other methods involving a reconfigurable functional unit are "coarse-grained" (large amounts of processing handled by the functional unit at a time). Once the unit has been configured, it becomes a special purpose processor for a particular type of code and data. Other "fine-grained" (small amounts of program or processing time affected) techniques used in processors are very general in their applicability, but are fixed in the design of the CPU. This invention provides fine-grained, general purpose acceleration that is dynamically reconfigurable.

5) An important part of the invention is the provision that the configuration of the logic array can be done by software, either on-the-fly or statically (at program load time). This allows a flexibility and maintainability, and opportunity for continued improvement and refinement which cannot be achieved by competing "hard-wired" methods.

6) This invention reduces dramatically the instruction fetch traffic and the corresponding pressure for bandwidth that is placed on instruction caches in processors using current state of the art speed-up techniques. This means smaller and simpler caches can be used for a given performance level, resulting in lower-cost CPUs and systems.

While the preferred embodiments of the invention have been shown and described, numerous variations and alternative embodiments will occur to those skilled in the art. Accordingly, it is intended that the invention be limited only in terms of the appended claims.

The invention claimed is:

1. A central processing unit comprising, a first processor for executing program instructions a program counter and registers shared by said first processor, said program counter containing an indicator of the address of the next said program instruction to be performed, a function lookup unit sharing said program counter and registers, said first processor and said functional lookup unit sharing parallel access to said program counter and registers, said function lookup unit having, a lookup cache with a tag field, and a function indicator field, said lookup cache communicating with said program counter to determine the presence of a match between the contents of said tag field and said program counter indicator, upon finding a match between said tag field and said program counter indicator said function lookup unit assumes control of execution at said program instruction indicated by said program counter and upon finding no match said first processor assumes control of execution at said program instruction indicated by said program counter, a reconfigurable combinational array having logic functions available which provide a mapping from a beginning state on entry to a block of program instructions to an ending state on exit from said block of program instructions, said logic functions having identifiers in said function indicator field, said reconfigurable combinational array receiving a function indicator identifier from said lookup cache upon finding a match between said tag field and said program counter indicator, said functional indicator identifier causing said logic function to be executed in place of said block of program instructions starting at said program counter indicator.

2. The central processing unit of claim 1 also including an exception routine that provides a logically synthesized function for said block of program instructions identified by said program counter in response to an attention signal from said function lookup unit, said exception routine providing said synthesized function to said reconfigurable combinational array and a corresponding function indicator to said function indicator field.

3. The central processing unit of claim 1 in which said logic functions are preloaded into said reconfigurable combinational array before executing said program instructions.

4. The central processing unit of claim 2 in which said logic functions synthesized by said exception routine are created and loaded into said reconfigurable combinational array on the fly as program instructions are being executed.

5. The central processing unit of claim 2 having a counter for determining the number of times said block of program instructions is executed, said exception routine being initiated when said counter reaches a threshold number of repetitions of said block of program instruction executions.

6. The central processing unit of claim 5 in which said counter is a count field in said lookup cache.

7. The central processing unit of claim 1 in which said first processor provides an indication to said function lookup unit when said first processor overwrites the contents of a program counter address, said function lookup unit responds to said indication and searches for a matching program counter address in said lookup cache, upon finding a matching cache program counter address the cache makes a note that the cache lookup program counter address has been overwritten.

8. The central processing unit of claim 7 in which said noted presence of said matching cache program address causes the matched program address in said lookup cache to be inactivated.

9. The program counter of claim 1 in which said indicator of the program instruction address is an address.

* * * * *